United States Patent [19]

Mitchell et al.

[11] Patent Number: 4,859,733

[45] Date of Patent: Aug. 22, 1989

[54] POLYOLEFIN COMPOSITIONS CONTAINING TRIALKANOLAMINES

[75] Inventors: David J. Mitchell; Vaclav G. Zboril, both of Kingston, Canada

[73] Assignee: Du Pont Canada Inc., Mississauga, Canada

[21] Appl. No.: 228,061

[22] Filed: Aug. 4, 1988

[30] Foreign Application Priority Data

Aug. 11, 1987 [GB] United Kingdom ............... 8718982

[51] Int. Cl.[4] .................. C08F 2/42; C08F 10/02; C08F 4/64

[52] U.S. Cl. .................. 524/432; 524/450; 523/116; 585/12; 502/113; 525/333.7; 525/373; 525/366; 525/380

[58] Field of Search ............... 524/432, 450; 523/116; 585/12; 502/113; 525/333.7, 366, 373, 380

[56] References Cited

U.S. PATENT DOCUMENTS

| 41,248 | 6/1983 | Zboril et al. | |
|---|---|---|---|
| 3,773,743 | 11/1973 | Ainsworth et al. | 260/94.9 F |
| 4,454,270 | 6/1984 | Kolodchin et al. | 524/102 |
| 4,547,473 | 10/1985 | Hamilton et al. | 502/113 |
| 4,711,923 | 12/1987 | Zboril | 524/323 |
| 4,777,229 | 10/1988 | Zboril et al. | 526/84 |

FOREIGN PATENT DOCUMENTS

| 660869 | 4/1963 | Canada . |
| 732297 | 4/1966 | Canada . |
| 0193262 | 9/1986 | European Pat. Off. . |

*Primary Examiner*—John Kight
*Assistant Examiner*—C. Azpuru

[57] ABSTRACT

A method is disclosed for the reduction of the extractability of trialkanolamines from polyolefins containing such compounds e.g. as a result of the use of trialkanolamines as catalyst deactivators in processes for the polymerization of olefins. Zinc oxide and/or zeolite molecular sieves are incorporated into the polyolefin, either during the process for the manufacture of the polyolefin or subsequent to such manufacture. Zinc oxide may be used in amount of 0.01–4 parts by weight and zeolite molecular sieves in amounts of 0.05–1 parts by weight, per 100 parts of polyolefin. The resultant compositions may be more acceptable for use in the fabrication of articles intended for the packaging of e.g. foodstuffs.

11 Claims, No Drawings

POLYOLEFIN COMPOSITIONS CONTAINING TRIALKANOLAMINES

The present invention relates to polyolefin compositions containing trialkanolamines and especially to such compositions in which the extractability of the trialkanolamines from the polyolefin has been reduced.

Polymers of ethylene, especially, homopolymers of ethylene and copolymers of ethylene and higher alpha-olefins, are used in large volumes for a wide variety of end uses, for example, in the form of film, fibres, moulded or thermoformed articles, pipe, coatings and the like. In many such end-uses, it is important or preferred that compounds incorporated into the polyolefin during or subsequent to the manufacturing process exhibit a low level of migration from the polyolefin and/or a low level of extractability from the polyolefin in the presence of other materials, especially organic materials. One such end-use is in the packaging of foodstuffs.

Processes for the preparation of homopolymers of ethylene and copolymers of ethylene and higher alpha-olefins are known. A particularly preferred process for the polymerization of such monomers is the high temperature or "solution" polymerization process, examples of which are described in Canadian Patent 660 869 of A. W. Anderson, E. L. Fallwell and J. M. Bruce, which issued 1963 April 09, and in published European patent application No. 193 262 of V. G. Zboril, published 1986 September 03.

The polymerization reaction in a solution polymerization process is normally terminated by addition of a so-called "deactivator". Deactivators for a solution polymerization process include trialkanolamines, the use of which is disclosed in published European patent application No. 243 083 of D. J. Mitchell and V. G. Zboril, published 1987 October 28. Trialkanolamines have been found to be effective deactivators in a solution polymerization process and result in the production of polymer of commercially-acceptable colour even in the absence of a step in the process for the removal of the deactivated catalyst. However, under some circumstances, trialkanolamines may migrate and/or be extractable from the polymer and for some end-uses a low level of migration or extractability may be preferred.

It has now been found that the migration and extractability of trialkanolamines from polyolefins may be decreased by incorporating zinc oxide or zeolite molecular sieves into the polyolefin.

Accordingly, the present invention provides a composition of a polyolefin selected from the group consisting of homopolymers of ethylene and copolymers of ethylene and at least one $C_3$–$C_{10}$ hydrocarbon alpha-olefin, said polyolefin containing at least 20 ppm of at least one trialkanolamine of the formula $N(ROH)(R'OH)_2$, where R is isopropyl and R' is alkyl of 2–4 carbon atoms, and an agent selected from the group consisting of zinc oxide and a zeolite molecular sieve, and mixtures thereof, the amount of zinc oxide being 0.01 to 4 parts by weight and the amount of zeolite molecular sieve being 0.05 to 1 parts by weight, per 100 parts by weight of polyolefin.

In a preferred embodiment, both of the R' groups of the trialkanolamine are the same, being isopropyl or ethyl. Alternatively, a mixture of trialkanolamines may be used, especially a mixture of trialkanolamines having both R' groups as isopropyl, both R' groups as ethyl and with one R' group being isopropyl and the other ethyl.

The present invention also provides a solution polymerization process for the preparation of high molecular weight polymers of alpha-olefins selected from the group consisting of homopolymers of ethylene and copolymers of ethylene and $C_3$–$C_{12}$ hydrocarbon alpha-olefins, said process comprising feeding monomer selected from the group consisting of ethylene and mixtures of ethylene and at least one $C_3$–$C_{12}$ hydrocarbon alpha-olefin, a coordination catalyst and inert hydrocarbon solvent to a reactor, said catalyst being a titanium-based and/or vanadium-based coordination catalyst, polymerizing said monomer at a temperature in the range of 105°–320° C. and a pressure of less than 25 MPa, deactivating the catalyst by admixing the solution so obtained with at least one trialkanolamine deactivating agent of the formula $N(ROH)(R'OH)_2$, where R is isopropyl and R' is alkyl of 2–4 carbon atoms, separating the hydrocarbon solvent and other volatile matter from the solution and recovering a composition of said high molecular weight polymer, the amount of deactivating agent being not more than 2.5 moles of deactivating agent per mole of halogen plus alkyl radicals in the coordination catalyst, in which process an agent is added to the polymer subsequent to the deactivation of the coordination catalyst and prior to the recovery of the polymer, said agent being selected from the group consisting of zinc oxide and a zeolite molecular sieve, and mixtures thereof, the amount of zinc oxide being 0.01 to 4 parts by weight and the amount of zeolite molecular sieve being 0.05 to 1 parts by weight, per 100 parts by weight of polyolefin.

In a preferred embodiment of the process, trialkanolamine is the sole deactivator.

In another embodiment, the coordination catalyst is deactivated by sequentially admixing said solution with trialkanolamine followed by a solution of a salt of an alkaline earth metal or zinc with aliphatic monocarboxylic acid, said salt being dissolved in hydrocarbon solvent.

The present invention is directed to a polyolefin composition and a solution polymerization process capable of being used in the manufacture of the polyolefin. In particular the polymers are high molecular weight homopolymers of ethylene and/or copolymers of ethylene and hydrocarbon alpha-olefins, preferably such alpha-olefins having 3 to 12 carbon atoms i.e. $C_3$–$C_{12}$, and especially $C_4$–$C_{12}$, alpha-olefins, including bicyclic alpha-olefins, examples of which are propylene, butene-1, hexene-1, octene-1 and bicyclo-(2,2,1) 2-heptene. In addition, the polymers may have been manufactured in a process in which cyclic endomethylenic dienes were fed to the process along with the ethylene or mixtures of ethylene and $C_3$–$C_{12}$ alpha-olefin, as described in Canadian Patent 980 498 of C. T. Elston, which issued 1975 December 23.

The present invention relates to compositions of such polyolefins that contain at least one trialkanolamine of the formula $N(ROH)(R'OH)_2$, where R is isopropyl and R' is alkyl of 2–4 carbon atoms, and especially at least 20 ppm of the trialkanolamine. In embodiments, the composition contains 20–750 ppm and especially 50–300 ppm of the trialkanolamine. Such trialkanolamine may be present in the polyolefin as a result of use of the trialkanolamine as a catalyst deactivator or other additive in the process for the manufacture of the polyolefin. The compositions also contain an agent selected from the group consisting of zinc oxide and a zeolite molecular sieve, and mixtures thereof. The amount of zinc oxide is 0.01 to 4 parts, especially 0.025 to 0.2 parts, by weight, per 100 parts by weight of polyolefin. The amount of zeolite molecular sieve is 0.05 to 1 parts, especially 0.1 to 0.5 parts, by weight, per 100 parts by weight of polyolefin.

The polyolefin described herein may be manufactured in a solution polymerization process. In such a process, monomer, a coordination catalyst and inert hydrocarbon solvent are fed to a reactor. Coordination catalysts for solution polymerization processes are known, for example those described in the aforementioned Canadian Patent 660 869, in Canadian Patent 1 119 154 of A. N. Mollison and V. G. Zboril, which issued 1982 March 02 and in European patent publication No. 131 420 of M. A. Hamilton D. A. Harbourne, C. G. Russell, V. G. Zboril and R. A. Mulhaupt, published Jan. 16, 1985. Such coordination catalysts may be titanium-based and/or vanadium based catalysts, especially titanium-based or titanium/vanadium-based catalysts in which 20–100% of the transition metal is titanium. The monomer is ethylene or a mixture of ethylene and one or more of the higher alpha-olefins.

Solution polymerization processes may be operated at temperatures of up to 320° C. and especially in the range 105°–310° C., the lower temperature being above the lowest solubilization temperature of the polymer, as will be understood by those skilled in the art of solution polymerization processes. The pressures used in the process are those known for solution polymerization processes viz. less than 25 MPa and especially in the range of about 4–25 MPa. The pressure and temperature are controlled so that both the unreacted monomers and the polymer formed remain in solution.

The hydrocarbon solvent used in the polymerization process is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 80% by weight of the reaction mixture. In the process, the monomer is dissolved in the solvent.

The mixture that passes from the polymerization reactor comprises polymer, unreacted monomers, coordination catalyst some of which remains in an active state, and hydrocarbon solvent. A deactivator is added to the mixture to terminate the polymerization process.

In the process of the aforementioned published European patent application of D. J. Mitchell and V. G. Zboril, the deactivator is at least one trialkanolamine of the formula N(ROH)(R' OH)2, where R is isopropyl and R' is alkyl of 2-4 carbon atoms. In a preferred embodiment both of the R' groups are the same, being either ethyl or isopropyl. Alternatively, the trialkanolamine may be a mixture of trialkanolamines, especially a mixture of a trialkanolamine having both R' groups as isopropyl, a trialkanolamine having both R' groups as ethyl and a trialkanolamine having one R' group as isopropyl and the other as ethyl. Triisopropanolamine is the preferred deactivator.

The trialkanolamine(s) will usually be fed into the polymerization process in the form of a solution in hydrocarbon solvent, normally the same hydrocarbon solvent as is fed to the polymerization reactor. If a different solvent is used, it must be compatible with the solvent used in the polymerization process, not cause precipitation of any component of the polymerization mixture and not cause adverse effects on the solvent recovery system associated with the polymerization process.

Trialkanolamine may be the sole deactivator used in the polymerization process. Alternatively, the coordination catalysts may be deactivated by sequentially admixing with the solution passing from the polymerization reactor (a) at least one trialkanolamine and (b) a solution of a non-stoichiometric salt of an alkaline earth metal or zinc with an aliphatic monocarboxylic acid, such salt being dissolved in hydrocarbon solvent, especially a salt having excess acid to facilitate solubility.

The salt of the second deactivator solution must be dissolved in the solvent in order to obtain intimate contact between the deactivator and the product of reaction of catalyst with the first deactivator, and to obtain uniform dispersion of the deactivator and catalyst residues i.e. the form of the catalyst after deactivation, throughout the polymer, thereby facilitating the production of polymer of uniform properties.

In the salt of the second deactivator solution, the metal is an alkaline earth metal or zinc, especially magnesium or calcium. The remainder of the salt is derived from at least one aliphatic carboxylic acid, especially such an acid having 6 to 20 carbon atoms. In a preferred embodiment the acid has 8 to 12 carbon atoms. The acid is preferably a branched chain aliphatic acid although straight chain aliphatic acids and cycloaliphatic acids may be used. Moreover, the acids may be saturated or unsaturated acids. However, the acid must be such that the salt thereof that is used in the process of the present invention is soluble in the hydrocarbon solvent used therein. In preferred embodiments the salt is calcium 2-ethyl hexanoate, calcium naphthenate, calcium isostearate or the like.

In an alternative embodiment, the solution passing from the polymerization reactor is deactivated with (a) a minor amount of a first deactivator and (b) trialkanolamine, optionally admixed with the salt of an alkaline earth metal or zinc with an aliphatic monocarboxylic acid described hereinabove. Such an embodiment is described in greater detail in the aforementioned European patent application of D. J. Mitchell and V. G. Zboril.

The amount of first deactivating agent, or of trialkanolamine if it is the sole deactivating agent, is not more than 2.5 moles of deactivating agent per mole of halogen plus alkyl radicals in the coordination catalyst; as used herein a mole of catalyst component such as diethyl aluminum chloride, as used in the preparation of the catalyst, is deemed to contain two equivalents of ethyl groups and one equivalent of chlorine, the sum of such equivalents being referred to as "moles of halogen plus alkyl groups", and the calculation of the amount of the deactivating agent is to be made on such a basis. Preferably 0.25–1.5 moles of such deactivator are added per mole of halogen plus alkyl radicals in the catalyst.

The thus deactivated and treated polymerization mixture is fed to a separator, which may be a multistage separator, to separate unreacted monomer, hydrocarbon solvent and any other volatile matter from the polymer. In contrast to the usual practice in a solution process, no steps are taken to remove catalyst residues from the polymer using adsorbents or other techniques. After separation from solvent and unreacted monomer, the polymer may, for example, be formed into pellets or other suitable comminuted shapes e.g. by extrusion into water and cutting into pellets or other suitable comminuted shapes.

The zinc oxide and/or molecular sieve may be added to the process immediately following the deactivation of catalyst. Alternatively, the zinc oxide and/or zeolite molecular sieve may be added to the polymer at a subsequent stage in the process e.g. at the time of addition of other additives, for example stabilizers, and especially immediately prior to extrusion of the polymer in the form of pellets. It is important, however, that the zinc oxide and/or zeolite molecular sieve be added in a manner that results in a uniform distribution thereof in the polymer.

In embodiments, the amount of zinc oxide added to the polymer is 0.01 to 4 parts, especially 0.025 to 0.2 parts, by weight of zinc oxide per 100 parts of polymer, and the amount of zeolite molecular sieve is 0.05 to 1 parts, especially 0.1 to 0.5 parts, by weight of zeolite molecular sieve per 100 parts of polymer.

The zinc oxide and zeolite molecular sieve should be of a fine particle size, especially particle sizes typically used in the addition of pigments and the like to polymers e.g. 1-20 microns and especially 1-5 microns. In addition, the zeolite molecular sieve should have a pore size of at least 10 Angstroms.

The recovered polymer may then be treated with saturated steam, optionally admixed with air, at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes; all or part of the zinc oxide and/or zeolite molecular sieve may also be added to the polymer as such an additive, to form compositions of the invention.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range of 0.25:1 to 1:1 with the total amount of antioxidant being in the range of 400 to 2000 ppm. Examples of suitable hindered phenolic antioxidants are octadecyl-3,5-di-tert.butyl-4-hydroxy cinnamate, tetrakis-methylene-3-(3',5'-di-tert.butyl-4-hydroxyphenyl) propionate methane and octadecyl-3-(3,5-di-tert.butyl-4-hydroxyphenyl) propionate. Examples of secondary antioxidants are di(stearyl)-pentaerythritol diphosphite, tris(2,4-di-tert.butyl phenyl) phosphite, dilauryl thiodipropionate and bis(2,4-di-tert.butyl phenyl) pentaerythritol diphosphite.

In addition to antioxidants, other stabilizers, especially stabilizers against the effect of ultra-violet light, may be incorporated into the polymer. Such other stabilizers are usually incorporated into the polymer before the polymer is initially formed into pellets. Examples of ultraviolet stabilizers are 2-hydroxy-4-n-octoxybenzophenone, 2-(3'-tert.butyl-2'-hydroxy-5'-methylphenyl)5-chlorobenzotriazole, bis-(2,2,6,6-tetramethyl4-piperidyl) sebacate and poly-(N-hydroxyethyl-2,2,6,6-tetramethyl-4-hydroxypiperidyl) succinate.

In alternative embodiments, the zinc oxide and/or zeolite molecular sieve may be added to the polymer subsequent to the separation of the polymer from the process for the manufacture of the polymer. In such embodiment the zinc oxide and/or zeolite molecular sieve may be compounded into a polyolefin to form a concentrate, especially into the same or a similar polyolefin to that with which the concentrate is to be blended or in particular into a polyolefin of lower melt viscosity as is disclosed in published European patent application No. 172 650 of G. White, published 1986 February 26.

The polymers produced by the process of the present invention are capable of being fabricated into a wide variety of articles, as is known for homopolymers of ethylene and copolymers of ethylene and higher alpha-olefins. The present invention provides polymers containing trialkanolamines as defined herein in which the extractability of the trialkanolamine into, in particular, foodstuffs is reduced, thereby rendering polyolefins containing trialkanolamines more acceptable for the packaging of foodstuffs.

The present invention is illustrated by the following examples.

EXAMPLE I

An ethylene/butene-1 copolymer having a density of 0.92 g/cm$^3$ and a melt index of 5 dg/min was manufactured in a commercial scale solution polymerization process using a titanium/vanadium coordination catalyst. The deactivator used in the process was triisooorooanolamine ("TIPA") in toluene.

In order to test the effect of an agent on the extractability of TIPA from the polymer, a concentrate of the agent and polymer was prepared by dry-blending the agent with ground polymer. The blend was then extruded through a Brabender* single screw extruder equipped with a 1.9 cm screw and pelletized. Pellets of the concentrate and the polymer containing TIPA were then melt blended using the Brabender extruder and re-pelletized. The extrusion of the polymer containing TIPA was carried out under relatively mild extrusion conditions, using melt temperatures at the die of 190° C., in order to reduce loss of the TIPA as a result of the extrusion process. The control sample of the polymer i.e. a sample that did not contain agent was obtained by extrusion of polymer containing TIPA under the same conditions.

* denotes trademark

The amount of TIPA in the polymer was determined using the following procedure: a sample weighing approximately 5 g was added to a solution of 10 ml of carbon disulphide and 1 ml of Tri-sil "Z" * derivatizing agent, which converts TIPA to its silyl ester; azobenzene was added as an internal analytical standard: this procedure was demonstrated to provide complete extraction of TIPA from the polymer. The mixture of polymer and solution was placed in a vessel on a roller for a period of twenty-four hours at ambient temperature. The solution was then analyzed using gas chromatography; the column was DB-1, a bonded silicone capillary column obtained from J & W Scientific Inc., and was 10 m in length. The gas chromatograph was temperature programmed, between 100° C. and 250° C. It is estimated that the precision in the measurement of the level of TIPA was about ±6%.

denotes trade mark

Tests with solvents intended to simulate the extraction of TIPA with foodstuffs indicated that a mixture of 95% ethanol, by weight, in water had the highest level of extraction of the solvents tested. Thus, tests simulating the effect of foodstuffs were conducted using this solvent. A sample of 10 g of polymer to be tested was contacted with boiling 95% ethanol solution and the vessel containing the mixture was promptly immersed in a water bath at 50° C. After a predetermined time, the polymer was separated from the solvent and washed with a further amount of the ethanol solution. In order to determine the amount of TIPA that had been extracted, samples of the polymer were extracted with the carbon disulphide solution, as described above, before and after being subjected to the ethanol extraction.

In separate runs, experiments were conducted using polymer containing relatively high, intermediate and relatively low levels of TIPA.

Further experimental details and the results obtained are given in Table I. In some experiments, as indicated, the pellets were subjected to steam in order to simulate treatment of pellets with steam, for removal of residual solvent, during the manufacturing process.

TABLE I

| Run No. | Agent* | Amount (ppm) | Time (hr.) | TIPA Level (ppm) before | TIPA Level (ppm) after | Extn.** (%) |
|---|---|---|---|---|---|---|
| 1 | — | — | 45 | 160 | 80 | 50 |
| 2 | TiOx | 200 | 45 | 150 | 85 | 43 |
| 3 | — | — | 67 | 210 | 120 | 43 |
| 4 | 13X | 1000 | 67 | 120 | 70 | 42 |
| 5 | AA | 310 | 67 | 150 | 110 | 27 |
| 6 | — | — | 45 | 30 | 15 | 50 |
| 7 | ZnO | 300 | 45 | 35 | 35 | 0 |
| 8 | — | — | 72 | 190 | 105 | 45 |
| 9 | ZnO | 500 | 72 | 135 | 110 | 19 |
| 10 | — | — | 72 | 105 | 60 | 43 |
| 11 | ZnO | 250 | 72 | 75 | 70 | 7 |
| 12 | AA | 250 | 72 | 80 | 60 | 25 |
| 13 | ZnO | 500 | 72 | 70 | 70 | 0 |
| 14 | AA | 500 | 72 | 70 | 55 | 21 |
| 15 | NaX | 1000 | 72 | 60 | 35 | 42 |
| 16 | NaX | 2000 | 72 | 25 | 20 | 20 |
| 17 | ZnSt | 500 | 77 | 60 | 40 | 33 |
| 18 | ZrOP | 500 | 77 | 65 | 35 | 46 |
| 19 | ZrOP | 1000 | 77 | 65 | 25 | 62 |

*TiOx = titanium dioxide
13X = zeolite molecular sieve 13X, obtained from Alpha Products, Thiokol Ventron Division
AA = adipic acid
ZnO = zinc oxide
NaX = zeolite molecular sieve, obtained from Sigma Chemical Company
ZnSt = zinc stearate
ZrOP = zirconium isopropoxide
**Extn = Extraction
Note: The samples were steam treated in Runs 17–19

This example shows that zinc oxide inhibited the extraction of triisopropanolamine from the polymer. In addition, the zeolite molecular sieve reduced the amount of triisopropanolamine extracted both before and after contact with the 95% ethanol solution, thereby appearing to affect the level of extractability of the triisopropanolamine under the experimental conditions used.

EXAMPLE II

The procedure of Example I was repeated except that the extraction with the ethanol solution was conducted for a period of ten days. Further experimental details and the results obtained are given in Table II.

TABLE II

| Run No. | Agent* | Amount (ppm) | TIPA Level (ppm) before | TIPA Level (ppm) after | Extn. (%) |
|---|---|---|---|---|---|
| 20 | ZnO | 250 | 75 | 60 | 20 |
| 21 | ZnO | 500 | 70 | 60 | 14 |
| 22 | — | — | 80 | 30 | 63 |
| 23 | ZnO | 250 | 45 | 35 | 22 |
| 24 | NaX | 2000 | 20 | 5 | 75 |
| 25 | AA | 250 | 80 | 35 | 56 |

*See Table I
Note: The samples were steam treated in Runs 22–25

The results obtained with the longer period of extraction with the ethanol solution are similar to those obtained in Example I.

EXAMPLE III

Pellets of polymer containing zinc oxide were prepared using the procedure of Example I. The resultant pellets were then injection moulded, using an Engels* injection moulding apparatus, into plaques having a thickness of 0.63 mm. The plaques were cut into sections measuring 1.27×3.18 cm. A number of sections, weighing a total of approximately 10 g, were extracted in a solution of 95 % ethanol solution for periods of either 3 days or 10 days. The amount of TIPA in the sections before and after extraction with ethanol was determined by the method of Example I.

Further experimental details and the results obtained are given in Table III.

TABLE III

| Run No. | Amount (ppm) | Time (days) | TIPA Level (ppm) before | TIPA Level (ppm) after | Extn. (%) |
|---|---|---|---|---|---|
| 26 | 0 | 3 | 47 | 27 | 43 |
| 27 | 500 | 3 | 13 | 11 | 17 |
| 28 | 0 | 10 | 47 | 9.0 | 81 |
| 29 | 500 | 10 | 13 | 8.9 | 33 |

This example illustrates that zinc oxide is effective in injection moulded parts to reduce the level of extraction of TIPA.

EXAMPLE IV

An aqueous slurry of zinc oxide (5%, weight basis), and polyethylene containing TIPA were fed to the hopper of a twin-screw extruder. The resultant mixture that was extruded from the extruder was pelletized. Samples of the pellets were extracted using the procedure of Example I, the extraction period being 3 days.

Further experimental details and the results obtained are given in Table IV.

TABLE IV

| Run No. | Amount (ppm) | Time (days) | TIPA Level (ppm) before | TIPA Level (ppm) after | Extn. (%) |
|---|---|---|---|---|---|
| 30 | 0 | 3 | 67 | 37 | 46 |
| 31 | 270 | 3 | 75 | 55 | 33 |
| 32 | 615 | 3 | 76 | 71 | 7 |
| 33 | 935 | 3 | 74 | 71 | 4 |
| 34 | 1000 | 3 | 78 | 74 | 5 |

This example shows that addition of zinc oxide to polyethylene in the form of an aqueous slurry will reduce the extractability of TIPA from the polyethylene, especially at levels in excess of 270 ppm e.g. at levels of 615 ppm or greater.

EXAMPLE V

An ethylene/butene-1 copolymer having a density of 0.920 g/cm$^3$ and a melt index of 5 dg/min was manufactured in a commercial scale solution polymerization process using the method described in Example I.

Two runs were made. The first run was a control run in which no additives, other than stabilizers, were added to the deactivated polymer solution prior to extrusion of the polymer in the form of pellets. In the second run, NaX zeolite obtained from Sigma Chemical Company was added; the zeolite was prepared as a 25% by weight concentrate in polyethylene and fed into the pelletizing extruder used in the polymerization process, at a rate such that the pelletized polymer contained about 1000 ppm of the zeolite. In both runs, the resulting pellets were treated with steam for 8 hours in order to remove residual polymerization solvent.

The degree of extraction of TIPA from the pellets was determined using the method described in Example I, and the results obtained are given in Table V.

TABLE V

| Run No. | Additive | Amount (ppm) | TIPA Level (ppm) |
|---|---|---|---|
| 35 | — | — | 120 |
| 36 | NaX | 1000 | 64 |

In this example, the addition of 1000 ppm of zeolite reduced the amount of TIPA extracted from the polymer by 47%.

We claim:

1. A composition of a polyolefin selected from the group consisting of homopolymers of ethylene and copolymers of ethylene and at least one C$_3$–C$_{10}$ hydrocarbon alpha-olefin, said polyolefin containing at least 20 ppm of at least one trialkanolamine of the formula N(ROH)(R'OH)$_2$, where R is isopropyl and R' is alkyl of 2–4 carbon atoms, and an agent selected from the group consisting of zinc oxide and a zeolite molecular sieve, and mixtures thereof, the amount of zinc oxide being 0.01 to 4 parts by weight and the amount of zeolite molecular sieve being 0.05 to 1 parts by weight, per 100 parts by weight of polyolefin.

2. The composition of claim 1 in which trialkanolamine is the sole deactivator.

3. The composition of claim 1 in which both of the R' groups of the trialkanolamine are the same, being isopropyl or ethyl.

4. The composition of claim 1 in which there is a mixture of trialkanolamines in the composition.

5. The composition of claim 4 in which the mixture is a mixture of at least two of trialkanolamines having (i) both R' groups as isopropyl, (ii) both R' groups as ethyl, and (iii) one R' group being isopropyl and the other ethyl.

6. A solution polymerization process for the preparation of high molecular weight polymers of alpha-olefins selected from the group consisting of homopolymers of ethylene and copolymers of ethylene and C$_3$–C$_{12}$ hydrocarbon alpha-olefins, said process comprising feeding monomer selected from the group consisting of ethylene and mixtures of ethylene and at least one C$_3$–C$_{12}$ hydrocarbon alpha-olefin, a coordination catalyst and inert hydrocarbon solvent to a reactor, said catalyst being a titanium-based and/or vanadium-based coordination catalyst, polymerizing said monomer at a temperature in the range of 105°–320° C. and a pressure of less than 25 MPa, deactivating the catalyst by admixing the solution so obtained with at least one trialkanolamine deactivating agent of the formula N(ROH)(R'OH)$_2$, where R is isopropyl and R' is alkyl of 2–4 carbon atoms, separating the hydrocarbon solvent and other volatile matter from the solution and recovering a composition of said high molecular weight polymer, the amount of deactivating agent being not more than 2.5 moles of deactivating agent per mole of halogen plus alkyl radicals in the coordination catalyst, in which process an agent is added to the polymer subsequent to the deactivation of the coordination catalyst and prior to the recovery of the polymer, said agent being selected from the group consisting of zinc oxide and a zeolite molecular sieve, and mixtures thereof, the amount of zinc oxide being 0.01 to 4 parts by weight and the amount of zeolite molecular sieve being 0.05 to 1 parts by weight, per 100 parts by weight of polyolefin.

7. The process of claim 6 in which trialkanolamine is the sole deactivator.

8. The process of claim 6 in which the coordination catalyst is deactivated by sequentially admixing said solution with trialkanolamine followed by a solution of a salt of an alkaline earth metal or zinc with aliphatic monocarboxylic acid dissolved in hydrocarbon solvent.

9. The process of claim 6 in which both of the R' groups of the trialkanolamine are the same, being isopropyl or ethyl.

10. The process of claim 6 in which there is a mixture of trialkanolamines in the composition.

11. The process of claim 10 in which the mixture is a mixture of at least two of trialkanolamines having (i) both R' groups as isopropyl, (ii) both R' groups as ethyl, and (iii) one R' group being isopropyl and the other ethyl.

* * * * *